United States Patent [19]
Khanna et al.

[11] Patent Number: 6,040,392
[45] Date of Patent: Mar. 21, 2000

[54] NYLON 6 OR 66 BASED COMPOSITIONS AND FILMS FORMED THEREFROM HAVING REDUCED CURL

[75] Inventors: Yash P. Khanna, Morristown; Frank H. Puterbuagh, Jr., Milford; William P. Kuhn, Pine Brook; Martin J. Schena, Randolph, all of N.J.

[73] Assignee: AlliedSignal Inc., Morris Township, N.J.

[21] Appl. No.: 09/038,201

[22] Filed: Mar. 10, 1998

[51] Int. Cl.$^7$ ..................................................... C08L 77/00
[52] U.S. Cl. .................. 525/432; 428/475.8; 428/476.1; 524/538
[58] Field of Search ............................................... 525/432

[56] References Cited

U.S. PATENT DOCUMENTS

| | | | |
|---|---|---|---|
| 3,536,780 | 10/1970 | Schaaf et al. | 260/857 |
| 3,642,941 | 2/1972 | Schneider et al. | 260/857 |
| 3,645,932 | 2/1972 | Harrison et al. | 260/3 |
| 3,875,129 | 4/1975 | Herwig et al. | 260/857 |
| 3,926,924 | 12/1975 | Edgar et al. | 260/78 |
| 3,937,752 | 2/1976 | Ueno et al. | 260/857 |
| 4,196,108 | 4/1980 | Hinze et al. | |
| 4,218,509 | 8/1980 | Edgar et al. | 528/339 |
| 4,404,317 | 9/1983 | Epstein et al. | 524/538 |
| 4,444,829 | 4/1984 | Bollen et al. | 428/220 |
| 4,556,696 | 12/1985 | Stewart et al. | 525/432 |
| 4,559,156 | 12/1985 | Greaves et al. | 252/82 |
| 4,647,483 | 3/1987 | Tse et al. | 428/35 |
| 4,665,135 | 5/1987 | Tse et al. | 525/432 |
| 4,683,170 | 7/1987 | Tse et al. | 428/349 |
| 4,714,740 | 12/1987 | Lee et al. | 525/179 |
| 4,788,226 | 11/1988 | Curry | 521/184 |
| 4,877,684 | 10/1989 | Shephard et al. | 428/475.8 |
| 4,886,115 | 12/1989 | Betz et al. | 524/135 |
| 4,919,874 | 4/1990 | Windley | 264/168 |
| 4,980,407 | 12/1990 | Okumoto et al. | 524/449 |
| 5,026,763 | 6/1991 | Lohrbaecher et al. | 524/495 |
| 5,053,259 | 10/1991 | Vicik | 428/36.91 |
| 5,071,924 | 12/1991 | Koch et al. | 525/432 |
| 5,147,944 | 9/1992 | Takeda | 525/432 |
| 5,206,309 | 4/1993 | Altman | 525/432 |
| 5,223,196 | 6/1993 | Shridharani et al. | 264/78 |
| 5,248,738 | 9/1993 | Sato et al. | 525/432 |
| 5,264,282 | 11/1993 | Enggasser et al. | 428/364 |
| 5,266,655 | 11/1993 | Prevost et al. | 525/432 |
| 5,330,834 | 7/1994 | Windley | 428/364 |
| 5,344,679 | 9/1994 | Vicik | 428/36.91 |
| 5,344,708 | 9/1994 | Windley | 428/364 |
| 5,359,013 | 10/1994 | Mason et al. | 525/432 |
| 5,391,640 | 2/1995 | Akkapeddi et al. | 525/432 |
| 5,414,051 | 5/1995 | Mason et al. | 525/432 |
| 5,422,420 | 6/1995 | Shridharani | 528/349 |
| 5,480,945 | 1/1996 | Vicik | 525/432 |

FOREIGN PATENT DOCUMENTS

| | | |
|---|---|---|
| 25700/88 | 5/1989 | Australia . |
| 0 358 038 | 3/1990 | European Pat. Off. . |
| 0 408 390 | 1/1991 | European Pat. Off. . |
| 62-143969 | 6/1987 | Japan . |
| 1-154752 | 6/1989 | Japan . |
| WO 92/15641 | 9/1992 | WIPO . |

*Primary Examiner*—Ana Woodward
*Attorney, Agent, or Firm*—Roger H. Criss

[57] ABSTRACT

Super-miscible blends of nylon copolymers are provided as well as multilayered film structures made therefrom. A nylon composition is a substantially uniform blend of at least one semi-crystalline copolymer I and at least one semi-crystalline copolymer II, wherein the proportion by weight of each of copolymer I and copolymer II. The nylon compositions are extremely uniform, and have only a single melting point rather than individual melting points of the component nylon copolymer parts. Coextruded films of a layer of this nylon composition with an olefin containing polymer are suitable for use as barrier films, such as aroma barrier films, which have reduced curl.

14 Claims, 3 Drawing Sheets

NYLON 6 OR 66 BASED COMPOSITIONS AND FILMS FORMED THEREFROM HAVING REDUCED CURL

BACKGROUND OF THE INVENTION

1. Field of the Invention

The present invention relates to nylon copolymer compositions and to multilayered film structures made therefrom. More particularly, the invention pertains to coextruded films having at least one polyamide copolymer layer attached to at least one olefin containing polymer layer by means of an optional adhesive composition therebetween. Such structures are suitable for use as barrier films, such as aroma barrier films, which have reduced curl. The nylon compositions are extremely uniform, and have only a single melting point rather than individual melting points of the component nylon copolymer parts.

2. Description of the Prior Art

It is known in the art to prepare blends of nylon polymers. Melt blending of N6 and N66 under commercial processing conditions leads to non-homogenous products with two separate phases as indicated by their individual characteristic melting points. It is well known to prepare copolymers of N6 with other polyamides such as nylon 66, nylon 11, nylon 12, nylon 6T, nylon 46, etc. It has now been unexpectedly found that when blends are formed from two different nylon copolymers, each containing either nylon 6 or nylon 66, in certain proportions, that homogenous, super-miscible blends are formed having improved properties. Films produced from dual nylon copolymer compositions, when attached to polyolefin films produce multilayered structures having unexpectedly reduced curl.

U.S. Pat. No. 5,206,309 teaches heat stable films based on melt blends of N6 and N6/N66. U.S. Pat. Nos. 5,053,259 and 5,344,679 teach blends of an amorphous nylon, a copolyamide, and optionally a polyamide homopolymer. U.S. Pat. No. 4,877,684 claims films based on mixtures of nylon 6 and N6/N66. EP Patent 408,390 discloses the use of any polyamide, any copolyamide, or a mixture of polyamides along with amorphous polyamide or a copolyamide. Japanese patent 115,4752 discloses films based on mixtures of an aliphatic polyamide and a partially aromatic amorphous polyamide along with EVOH. AU Patent 8825700 discloses an aliphatic polyamide, e.g., nylon 6 or N6/66 copolyamide and an amorphous polyamide. All of these do not teach random copolymers of nylons in certain proportions to form a homogenous, miscible phase composition according to the invention. U.S. Pat. Nos. 4,647,483; 4,665,135 and 4,683,170, show blends of N6 plus a copolymer of N6/N66 or N6/N 12 rich in N6. A film that is formed from a blend of a polyamide and a polyolefin is described in U.S. Pat. No. 4,444,829.

It would be desirable to provide super-miscible blends of semi-crystalline nylon copolymers where each have a nylon 6 or nylon 66 moiety.

SUMMARY OF THE INVENTION

The invention provides a nylon composition which comprises a substantially uniform blend of at least one semi-crystalline copolymer I and at least one semi-crystalline copolymer II, wherein the proportion by weight of each of copolymer I and copolymer II is such that the composition has only one significant melting point; wherein (a) copolymer I is a copolymer of a semi-crystalline nylon A and a semi-crystalline different nylon B wherein nylon A is present in copolymer I in an amount of from about 70 percent to about 95 percent by weight and nylon B is present in copolymer I in an amount of from about 5 percent to about 30 percent by weight of copolymer I; and (b) copolymer II is a copolymer of semi-crystalline nylon A and at least one different semi-crystalline nylon C wherein nylon A is present in copolymer II in an amount of from about 40 percent to about 95 percent by weight and nylon C is present in copolymer II in an amount of from about 5 percent to about 60 percent by weight of copolymer II; and (c) wherein nylon A and nylon B are selected from the group consisting of nylon 6 and nylon 66; and (d) wherein nylon C is selected from the group consisting of nylon 9, nylon 11, nylon 12, nylon 46 and nylon 69.

The invention also provides a method for producing a substantially uniform nylon composition which comprises:

(i) forming a mixture of solid particles of at least one semi-crystalline copolymer I and at least one semi-crystalline copolymer II, wherein the proportion by weight of each of copolymer I and copolymer II is such that the composition has only one significant melting point; wherein and wherein copolymer I and copolymer II are as defined above; and (ii) melt blending the mixture at a temperature of at least the higher of the melting points of copolymer I or copolymer II.

The invention further provides a multilayered film structure which comprises at least one nylon composition film layer attached to at least one olefin containing polymer film layer, wherein the nylon composition film layer comprises a substantially uniform blend of at least one semi-crystalline copolymer I and at least one semi-crystalline copolymer II, wherein the proportion by weight of each of copolymer I and copolymer II is such that the composition has only one significant melting point; wherein copolymer I and copolymer II are as defined above.

The invention still further provides method for preparing a multilayered film structure which comprises coextruding a molten nylon composition film layer and a molten polyolefin layer attached onto at least one side of the nylon composition film layer, through a coextrusion die, wherein the polyolefin layer comprises at least one olefin containing polymer; wherein the nylon composition film layer comprises a substantially uniform blend of at least one semi-crystalline copolymer I and at least one semi-crystalline copolymer II, wherein the proportion by weight of each of copolymer I and copolymer II is such that the composition has only one significant melting point; wherein copolymer I and copolymer II are as defined above.

Such copolymers have improved anti-curling properties and a single melting point. According to this invention, nylon copolymers can be incorporated into a miscible blend in such a way that the resulting product is a one-component, homogenous material. The products of this invention are different from conventional blends in view of having only one melting point. The invention, in addition, allows one to incorporate multi-component copolyamides together with amorphous nylons, without observing non-homogeneity.

DETAILED DESCRIPTION OF THE PREFERRED EMBODIMENT

Figure 1:
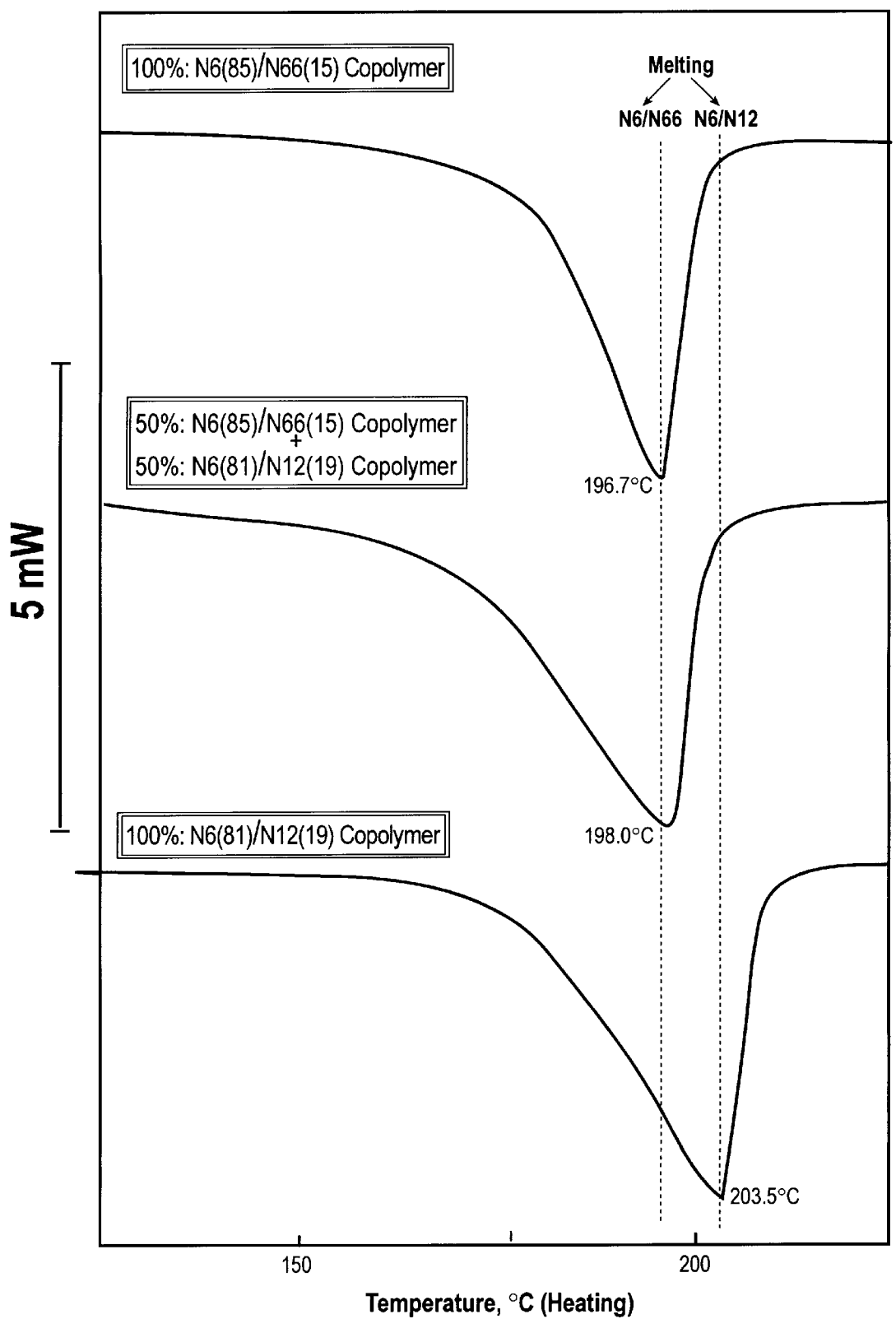
FIG. 1 shows a graph of the melting pattern of copolymer blended films.

In the practice of the present invention, a composition is prepared by melt blending at least one semi-crystalline copolymer which is a copolymer of a nylon A with a different nylon B, plus at least one semi-crystalline nylon copolymer which is a copolymer of nylon A with a different nylon C. The composition optionally also comprises a non-crystalline amorphous nylon copolymer D. The formed composition is determined to have only a single significant melting point. For purposes of this invention, having only a single significant point means that a second melting point, if one is observed, is no more than 35% of the main melting peak, more preferably no more than 20% of the main melting peak and most preferably no more than 10% of the main melting peak. The intensity of the second melting peak, if observed, is determined by known DSC methods. Such methods include analyzing a film to be tested after drying at 25° C.–45° C. under vacuum for several hours. The intensity of the major and any minor peaks in DSC are determined by heat of fusion integrated over the melting ranges of the individual peaks. Preferably the composition has only one melting point and no other melting point at all.

The first component of the inventive composition is a semi-crystalline copolymer of nylon A with a different nylon B. Each of nylon A and nylon B may be either nylon 6 or nylon 66. Nylon 6 is also known as poly(caprolactam) and nylon 66 is also known as poly(hexamethylene adipamide).

The second component of the inventive composition is a semi-crystalline nylon copolymer which is a copolymer of nylon A plus at least one different nylon C which may be nylon 9-poly(9-aminononanoic acid), nylon 11-poly(11-aminoundecanoic acid), nylon 12-poly(12-aminododecanoic acid), nylon 46 or nylon 69.

The number average molecular weight of the nylon A/nylon B copolymer as well as the nylon A/nylon C copolymer may vary widely. Such are sufficiently high to form a free standing film but sufficiently low to allow melt processing of the blend. Such number average molecular weights are well known to those of skill in the film forming art and are usually at least about 5,000 as determined by the formic acid viscosity (FAV) method (ASTM D-789). In this method, a solution of 11 grams of aliphatic polyamide in 100 ml of 90% formic acid at 25° C. is used. In the preferred embodiments of the invention, the number average molecular weight of nylon A as well as the nylon A/nylon B ranges from about 5,000 to about 100,000, preferable from about 10,000 to about 60,000 and more preferably from about 20,000 to about 40,000.

The nylon composition may further contain an optional non-crystalline, non-crystallizable, amorphous nylon component D. Amorphous nylons are well known in the art and are available commercially. Amorphous nylons are typically prepared by the reaction of at least one diamine with at least two different diacids. The result is a non-homogeneous nylon having no determinable melting point. Amorphous nylons are available as Grivory 21 available from EMS of Switzerland and Zytel amorphous nylon from DuPont.

The proportion by weight of each of copolymer I and copolymer II is such that the composition has only one significant melting point. Preferably the amount of copolymer I ranges from about 75% to about 95% and the amount of copolymer II ranges from about 5% to about 25% based on the weight of the composition. More preferably the amount of copolymer I ranges from about 90% to about 93% and the amount of copolymer II ranges from about 7% to about 10% based on the weight of the composition.

Nylon A is preferably present in copolymer I in an amount of from about 70 percent to about 95 percent by weight and nylon B is preferably present in copolymer I in an amount of from about 5 percent to about 30 percent by weight of copolymer I. More preferably the amount of nylon A in copolymer I ranges from about 75% to about 90% and the amount of nylon B ranges from about 10% to about 25% by weight of copolymer I. Most preferably the amount of nylon A in copolymer I ranges from about 80% to about 85% and the amount of nylon B ranges from about 15% to about 20% by weight of copolymer I.

Nylon A is preferably present in copolymer II in an amount of from about percent to about 95 percent by weight and nylon C is preferably present in copolymer II in an amount of from about 5 percent to about 60 percent by weight of copolymer II. More preferably the amount of nylon A in copolymer II ranges from about 50% to about 80% and the amount of nylon C ranges from about 30% to about 50% by weight of copolymer II. Most preferably the amount of nylon A in copolymer II ranges from about 50% to about 65% and the amount of nylon C ranges from about 35% to about 50% by weight of copolymer II.

When an amorphous nylon is included in the composition, it is present in the overall composition an amount of from about 1% to about 5%, preferably from about 2% to about 4% and more preferably from about 2% to about 3% based on the weight of the nylon composition.

The nylon composition may be formed by dry blending solid particles or pellets of each of the nylon components and then melt blending the mixture at a temperature of at least the melting point of the higher melting point component. Typical melting temperatures range from about 175° C. to about 260° C., preferably from about 215° C. to about 225° C., and more preferably from about 220° C. to about 223° C. Blending may take place in any suitable vessel such as an extruder, a roll mixer, or the like. Blending is conducted for a period of time required to attain a substantially uniform blend. Such may easily be determined by those skilled in the art. If desired, the composition may be cooled and cut into pellets for further processing, or it may be formed into films and optionally uniaxially or biaxially stretched by means well known in the art.

In the practice of the present invention, a multilayered film is prepared which is broadly composed of the nylon copolymer composition layer and a polyolefin layer attached to at least one side of the nylon layer by an optional adhesive. The adhesive preferably comprises at least one polyolefin having at least one functional moiety of an unsaturated carboxylic acid or anhydride thereof.

The polyolefins used herein include polymers of alpha-olefin monomers having from about 2 to about 6 carbon atoms and includes homopolymers, copolymers (including graft copolymers), and terpolymers of alpha-olefins. Illustrative homopolymer examples include ultra low density (ULDPE), low density (LDPE), linear low density (LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; and polyhexene.

Polyolefins such as polyethylenes are commonly differentiated based on the density which results from their numbers of chain branches per 1,000 carbon atoms in the polyethylene main chain in the molecular structure. Branches typically are $C_3$–$C_8$ olefins, and which are preferably butene, hexene or octene. For example, HDPE has very low numbers of short chain branches (less than 20 per 1,000 carbon atoms), resulting in a relatively high density, i.e. density ranges from about 0.94 gm/cc to about 0.97 gm/cc. LLDPE has more short chain branches, in the range of 20 to 60 per 1,000 carbon atoms with a density of about 0.91 to about 0.93 gm/cc. LDPE with a density of about 0.91 to about 0.93 gm/cc has long chain branches (20–40 per 1,000 carbon atoms) instead of short chain branches in LLDPE and HDPE. ULDPE has a higher concentration of short chain branches than LLDPE and HDPE, i.e. in the range of about 80 to about 250 per 1,000 carbon atoms and has a density of from about 0.88 to about 0.91 gm/cc. Illustrative copolymer and terpolymers include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). The term polyolefin as used herein also includes acrylonitrilebutadiene-styrene (ABS) polymers, copolymers with vinyl acetate, acrylates and methacrylates and the like. Preferred polyolefins are those prepared from alpha-olefins, most preferably ethylene polymers, copolymers, and terpolymers. The above polyolefins may be obtained by any known process. The polyolefin may have a weight average molecular weight of about 1,000 to about 1,000,000, and preferably about 10,000 to about 500,000. Preferred polyolefins are polyethylene, polypropylene, polybutylene and copolymers, and blends thereof. The most preferred polyolefin is polyethylene.

In accordance with the present invention, suitable adhesives include modified polyolefin compositions composed of a polyolefin having at least one functional moiety of unsaturated polycarboxylic acids and anhydrides thereof. Polyolefins include any of those listed above.

Unsaturated carboxylic acid and anhydrides include maleic acid and anhydride, fumaric acid and anhydride, crotonic acid and anhydride, citraconic acid and anhydride, itaconic acid an anhydride and the like. Of these, the most preferred is maleic anhydride. The modified polyolefins suitable for use in this invention include compositions described in U.S. Pat. Nos. 3,481,910; 3,480,580; 4,612,155 and 4,751,270 which are incorporated herein by reference. The most preferred adhesive is a maleic anhydride modified ethylene ✕-olefin copolymer which is also known as linear ultra low density polyethylene. The preferred modified polyolefin composition comprises from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified polyolefin composition may also contain up to about 40 weight percent of thermoplastic elastomers and alkyl esters as described in U.S. Pat. No. 5,139,878. The most preferred adhesive is Flexomer 1373 from Union Carbide which is a 10% maleic anhydride modified copolymer of ethylene and butene.

Each layer of the multilayer film structure can contain additives which are conventionally used in such films. Examples of such additives are pigments, dyes, slip additives, fillers, nucleating agents, plasticizers, lubricants, reinforcing agents, antiblocking agents, stabilizers and inhibitors of oxidation, thermal stabilizers and ultraviolet light stabilizers. Preferably, such may be present in an amount of about 10% or less based on the weight of the layer.

The multilayer films of this invention may be produced by conventional methods useful in producing multilayer films, including coextrusion, blown film and extrusion lamination techniques. In the most preferred method, the film is formed by coextrusion. Melted and plasticated streams of the polyamide and polyolefin layer materials are fed into a co-extrusion die. While in the die, the layers are juxtaposed and combined, then emerge from the die as a single multiple layer film of polymeric material. Suitable coextrusion techniques are more fully described in U.S. Pat. Nos. 5,139,878 and 4,677,017 except coextrusion in this invention is conducted at from about 460° F. (238° C.) to about 510° F. (266° C.). Coextrusion techniques include methods which include the use of a feed block with a standard die, a multimanifold die such as a circular die, as well as a multimanifold die such as used in forming multilayer films for forming flat cast films and cast sheets. Alternatively the composition may be formed into a film using a conventional blown film apparatus.

An advantage of coextruded films is the formation of a multilayer film in a one process step by combining molten layers of each of the film layers of polyamide and polyolefin blend into a unitary film structure. Preferably the multilayers form an inseparable bond with one another. The term "inseparable bond" as used herein shall mean a bond strength of at least about 700 g/inch as determined by testing the film according to the procedure set forth in ASTM D-3359-90 and F88-85.

In order to produce a multilayer film by a coextrusion process, it is necessary that the constituents used to form each of the individual films be compatible with the film extrusion process. The term "compatible" in this respect means that the film-forming compositions used to form the films have melt properties which are sufficiently similar so as to allow coextrusion. Melt properties of interest include, for example, melting points, melt flow indices, apparent viscosity, as well as melt stability. It is important that such compatibility be present to assure the production of a multilayer film having good adhesion and relatively uniform thickness across the width of the film being produced. As is known in the art, film-forming compositions which are not sufficiently compatible to be useful in a coextrusion process frequently produce films having poor interfacial lamination, poor physical properties as well as poor appearance. One skilled in the art can readily weigh the above-noted compatibility in order to select polymers having desirable physical properties and determine the optimal combination of relative properties in adjacent layers without undue experimentation. If a coextrusion process is used, it is important that the constituents used to form the multilayer film be compatible within a relatively close temperature range in order to permit extrusion through a common die. In the preferred embodiment when the nylon has a formic acid viscosity FAV of from about 120 to about 250 by ASTM D-789 and the polyolefin layer has a melt index of from about 0.5 to about 3 melt index units (MI) as determined by ASTM D-1238, the films will be compatible. That is, the nylon and polyolefin layers will flow uniformly in the coextruder. The multilayered structure may have two, three or more layers of alternating nylon and polyolefin layers with the optional adhesive intermediate each layer.

Alternatively, the multilayer films of the present invention can be produced by lamination whereby a multilayer film structure is formed from pre-fabricated film plies by methods which are well known in the art. The basic methods used in film laminating techniques are fusion, wet combining, and heat reactivating. Fusion, which is a method of laminating two or more film plies using heat and pressure laminated are comprised of polymers that readily form interfacial adhesion. Wet combining and heat reactivating are utilized in laminating incompatible films using adhesive materials. Typically, laminating is done by positioning the individual layers of the inventive film on one another under conditions of sufficient heat and pressure to cause the layers to combine into a unitary film. Typically the polyolefin and polyamide layers are positioned on one another, and the combination is passed through the nip of a pair of heated laminating rollers by techniques well known in the art such as those described in U.S. Pat. No. 3,355,347. Lamination heating may be done at temperatures ranging from about 75° C. to about 175° C., at pressures ranging from about 5 psig (0.034 MPa) to about 100 psig (0.69 MPa) for from about 5 seconds to about 5 minutes, preferably from about 30 seconds to about 1 minute.

The multilayer film, whether comprising a two, three or more layer structure, may be stretched or oriented in any desired direction using methods well known to those skilled in the art. Examples of such methods include those set forth in U.S. Pat. No. 4,510,301. Optionally, the film may be stretched uniaxially in either the direction coincident with the direction of movement of the film being withdrawn from the film forming apparatus, also referred to in the art as the "machine direction", or in as direction which is perpendicular to the machine direction, and referred to in the art as the "transverse direction", or biaxially in both the machine direction and the transverse direction. The films of the present invention have sufficient dimensional stability to be stretched at least 1.5 and preferably more than three times and more preferably from more than three times to about ten times in either the machine direction or the transverse direction or both. Typically for use in the present invention, the oriented film formed from the composition of the invention are preferably produced at draw ratios of from about 1.5:1 to about 6:1, and preferably at a draw ratio of from about 3:1 to about 4:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

Although each layer of the multilayer film structure may have a different thickness, the total thickness of the multi-layered structure preferably ranges from about 0.3 mils (7.6 $\mu$m) to about 5.0 mils (127.0 $\mu$m) and preferably from about 0.5 mils (12.7 $\mu$m) to about 1.5 mils (37.5 $\mu$m). While such thicknesses are preferred as providing a readily flexible film, it is to be understood that other film thicknesses may be produced to satisfy a particular need and yet fall within the scope of the present invention.

The following non-limiting examples serve to illustrate the invention.

EXAMPLES

The starting polymers used were analyzed by Gas Chromatography (GC) using standard procedures. The precision of these measurements is ±2%. The films were analyzed by Differential Scanning Calorimetry (DSC) using a Seiko RDC-220 thermal analyzer, equipped with a robotics system. About 7.5 (±0.5) mg of the film sample was crimped in an aluminum pan, heated from room temperature to about 280° C. at a heating rate of 10° C./min., and held there to erase crystalline memory. Subsequently, the sample was cooled from 280° C. to room temperature at a cooling rate of 10° C. and then reheated at the same rate. The $T_m$ reported in the examples is the one obtained upon initial heating cycle, i.e., corresponding to the "as—received films" cast under the same conditions. All grades of nylons used in this study are readily commercially available.

Example 1

This example prepares physical blends of a copolymer of nylon 6/nylon 66 with a copolymer of nylon 6/nylon 12. Dried pellets of 50% nylon 6 (85)/nylon 66(15) and 50% nylon 6(81)/nylon 12(19) copolymers were physically mixed in the weight percents indicated in Table 1. The compositions were dried at 82° C. for about 18 hours and then extruded through a Killion single screw extruder (D=1.5 in; L/D=24/1) equipped with three heating zones (232° C., 257° C. and 260° C.) and two adapters (260° C.). The melt temperature was measured as 267° C. After passing through an extrusion film die maintained at 260° C., the extrudate was cast on a roll maintained at 82° C. followed by a cooling roll maintained at 43° C. The resultant film had a total thickness of about 2 mil.

TABLE 1

| Film # | Film Description | Tm, ° C. |
|---|---|---|
| 1 | 100% N6(85)/N66(15) (control) | 196.7 |
| 2 | 50% N6(85)/N66(15) Copolymer 50% N6(81)/N12(19) Copolymer | 198.0 |
| 3 | 100% N6(81)/N12(19) Copolymer (control) | 203.5 |

The melting patterns of each film are plotted in FIG. 1. These data show that physical mixtures of a nylon 6/66 copolymers and a nylon 6/12 copolymer according to the invention (film 2) yields a composition having only one detectable melting point. It is clear that the blend according to the invention is homogenous and miscible in the crystalline phase, as evident by a single $T_m$. These data are shown in FIG. 1.

Example 2

This example prepares physical blends of a copolymer of nylon 6/nylon 66 with a copolymer of nylon 6/nylon 12. Dried pellets of nylon 6(85)/nylon 66(15) and nylon 6(50)/nylon 12(50) copolymers were physically mixed in the weight percents indicated in Table 2. The compositions were dried at 82° C. for about 18 hours and then extruded through a Killion single screw extruder (D=15 in; L/D=24/1) equipped with three heating zones (232° C., 257° C. and 260° C.) and two adapters (260° C.). The melt temperature was measured as 267° C. After passing through an extrusion film die maintained at 260° C., the extrudate was cast on a roll maintained at 82° C. followed by a cooling roll maintained at 43° C. The resultant film had a total thickness of about 2 mil.

TABLE 2

| Film # | Film Description | Tm, ° C. |
|---|---|---|
| 1 | 100% N6(85)/N66(15) (control) | 196.7 |
| 2 | 75% N6(85)/N66(15) Copolymer 25% N6(50)/N12(50) Copolymer | 195.3 |
| 3 | 100% N6(50)/N12(50) Copolymer (control) | 132.0 |

Figure 2:
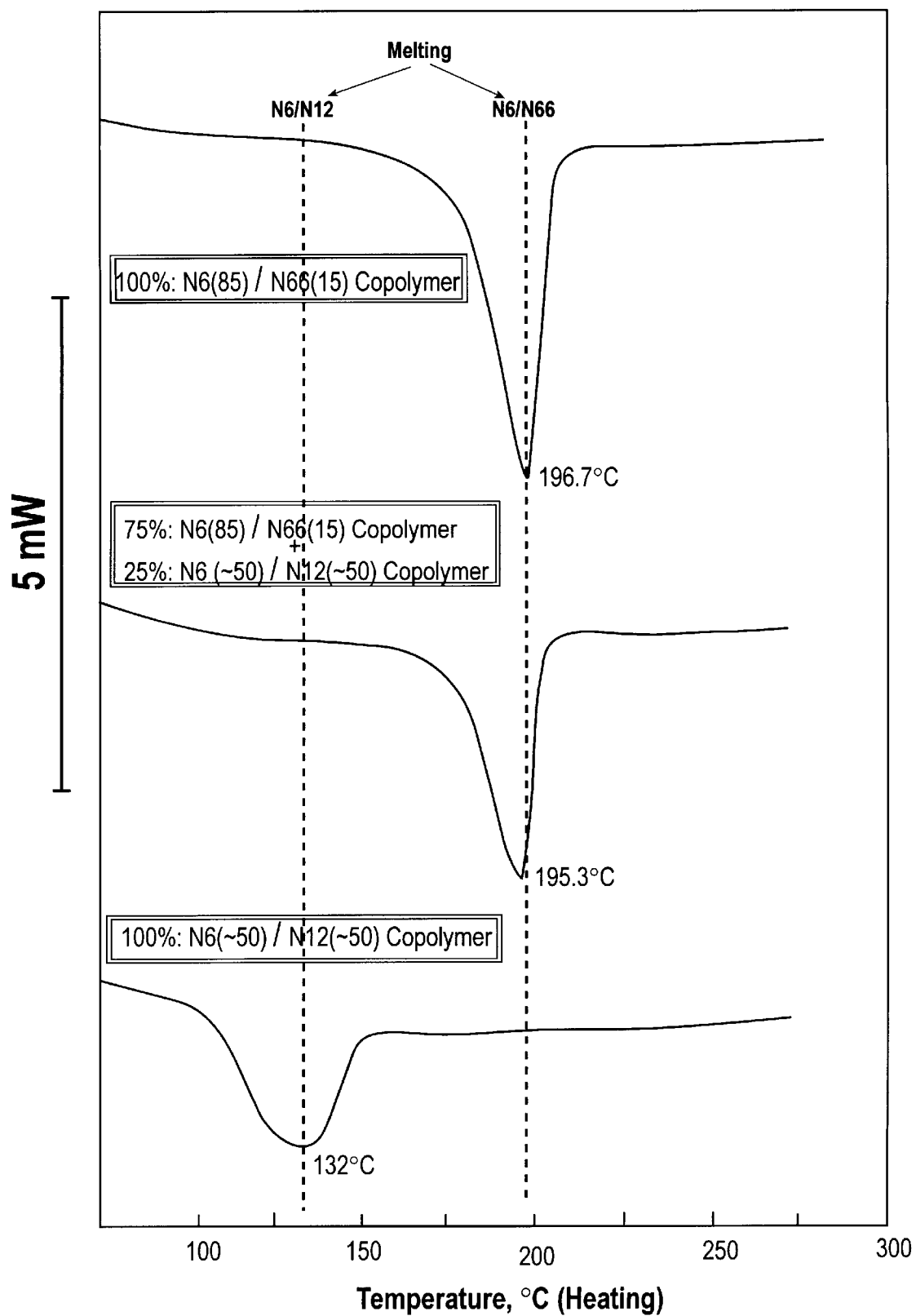
FIG. 2 shows a graph of the melting pattern of other copolymer blended films.

The melting patterns of each film are shown in FIG. 2. These data show that physical mixtures of a nylon 6/66 copolymers and a nylon 6/12 copolymer according to the invention (film 2) yield a composition having only one detectable melting point. It is clear that the blend according to the invention is homogenous and miscible in the crystalline phase, as evident by a single $T_m$. These data are exhibited in FIG. 2.

Example 3

This example prepares physical blends of copolymers nylon 6 and nylon 66 in varying proportions. Dried pellets of nylon 6 (85)/nylon 66(15) and nylon 6(50)/nylon 69(50) copolymers were physically mixed in the weight percents indicated in Table 3. The compositions were dried at 82° C. for about 18 hours and then extruded through a Killion single screw extruder (D=1.5 in; L/D=24/1) equipped with three heating zones (232° C., 257° C. and 260° C.) and two adapters (260° C.). The melt temperature was measured as 267° C. After passing through an extrusion film die maintained at 260° C., the extrudate was cast on a roll maintained at 82° C. followed by a cooling roll maintained at 43° C. The resultant film had a total thickness of about 2 mil.

TABLE 3

| Film # | Film Description | Tm, ° C. |
|---|---|---|
| 1 | 100% N6(85)/N66(15) (control) | 196.7 |
| 2 | 95% N6(85)/N66(15) Copolymer 5% N6(50)/N66(50) Copolymer | 196.8 |
| 3 | 90% N6(85)/N66(15) Copolymer 10% N6(50)/N69(50) Copolymer | 196.7 |
| 4 | 75% N6(85)/N66(15) Copolymer 25% N6(50)/N69(50) Copolymer | 195.4 and 128 |
| 5 | 100% N6(50)/N69(50) Copolymer (control) | 129.0 and 139.6 |

Figure 3:
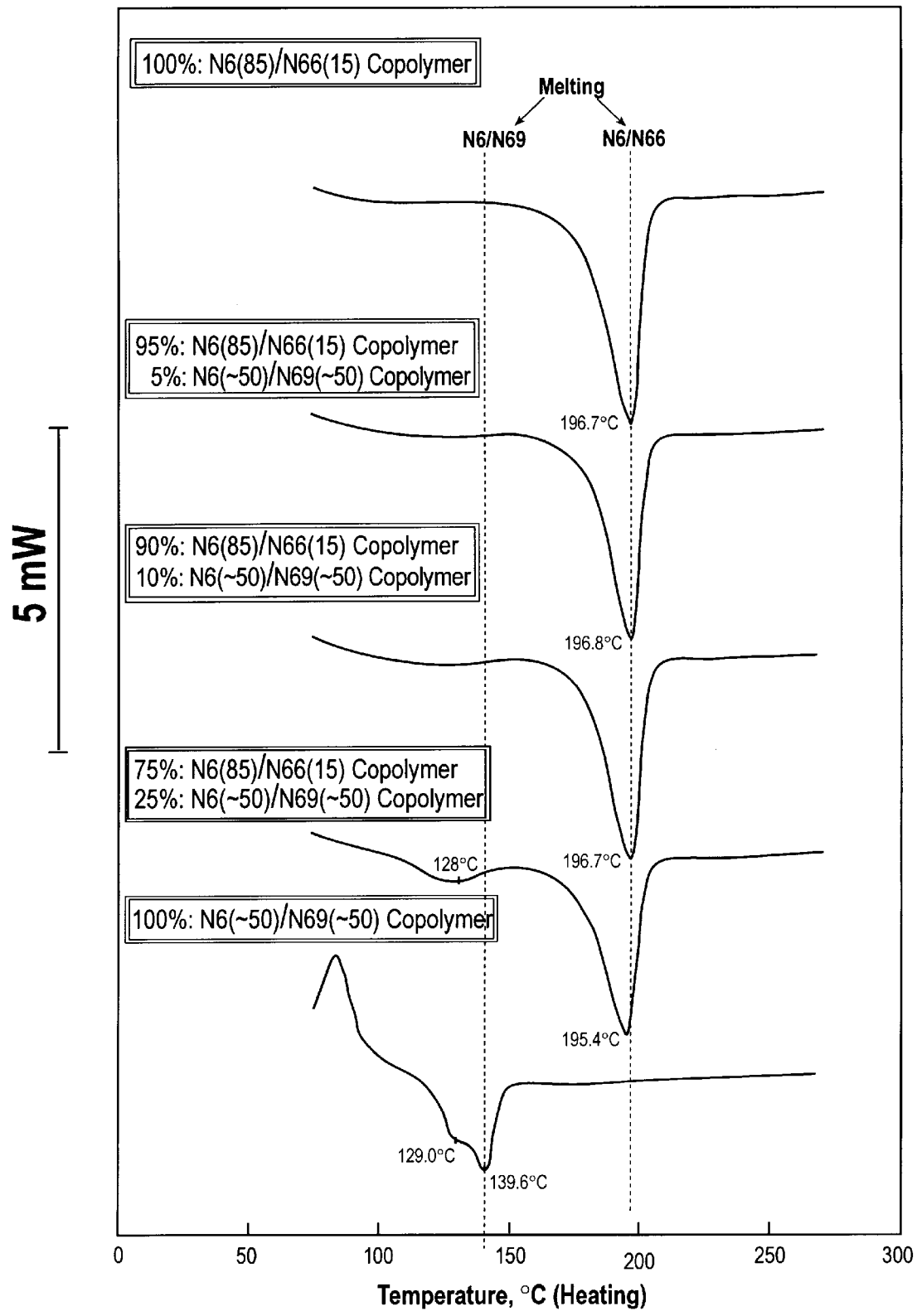
FIG. 3 shows a graph of the melting pattern of other copolymer blended films.

The melting patterns of each film are shown in FIG. 3. These data show that physical mixtures of two nylon copolymers according to the invention (films 2 and 3) yield a composition having only one detectable melting point. By increasing the amount of copolymer II to 25% (Film 4) a single significant melting point is detected as well as a trivial melting point at 128° C. It is clear that the blends according to the invention are homogenous and miscible in the crystalline phase, as evident by a single $T_m$. These data are shown in FIG. 3.

It is clear that the blends according to the invention are homogenous and miscible in the crystalline phase as evidenced by their single significant melting points. Examples 1–3 show that the two copolymers can be blended in any proportion as long as only one or predominantly one melting peak is observed, i.e. the mixed composition fulfills the criteria for super-miscibility.

Example 4

A three extruder system is constructed of 3.2 cm (1¼",) Killion single screw extruders (two with L/D=24/1, and the other with L/D=30/1).

Dried pellets of 50% nylon 6 (85)/nylon 66(15) and 50% nylon 6(81)/nylon 12(19) copolymers are physically mixed and fed into the extruder with L/D=30/1 with an extrusion profile set at 232° C., 254° C., and 260° C. for the heating zones 1–3 and 260° C. for the adapters. The melt temperature is measured at 257° C. A maleic anhydride modified polyolefin tie resin (density: 0.88 gm/cc, melt index: 1.0 gm/10 min. at 190° C. is extruded through a 3.2 cm (1¼") diameter Killion single screw extruder L/D=24/1 equipped with four heating zones and two adapters. The extruder temperature profiles are set at 238° C., 249° C., 260° C., 266° C. for the zone 1–4 and the adapters are maintained at 266° C. The resulting melt temperature is 263° C. Polyethylene is extruded in the extruder with L/D=24/1 with an extrusion profile set at 238° C., 252° C., 257° C., and 260° C. for the heating zone 1–4 and 260° C. for the adapters. The melt temperature is measured at 260° C. The extrudates, after passing through a coextrusion film die kept at 260° C., is then cast on a roll maintained at 38° C., followed by a cooling roll set at 35° C. The resultant film has a thickness of 25 μm. The polyethylenes used are: LDPE: low density PE–density=0.919, melt index=0.65; LLDPE: linear low density PE–density=0.920, melt index=1; MDPE: medium density PE–density=0.941, melt index=4; HDPE: high density PE–density=0.954, melt index=6. The films are exposed to the environment without restraints. No edge curl is noticed from any film. It can be seen from the foregoing that that the invention provides films having excellent curl resisting properties.

Example 5

Example 4 is repeated except the nylon used is nylon 6 homopolymer. Significant edge curl is noticed from the multilayered film produced.

Example 6

Example 4 is repeated except the nylon used is nylon 66 homopolymer. Significant edge curl is noticed from the multilayered film produced.

Example 7

Example 4 is repeated except the nylon used is N6(85)/N66(15) copolymer. Significant edge curl is noticed from the multilayered film produced.

Example 8

Example 4 is repeated except the nylon used additionally contains 2% of amorphous nylon. No significant edge curl is noticed from the multilayered film produced.

What is claimed is:

1. A nylon composition which consists essentially of a substantially uniform blend of at least one semi-crystalline copolymer I and at least one semi-crystalline copolymer II, wherein the proportion by weight of each of copolymer I and copolymer II is such that the composition has only one significant melting point; wherein (a) copolymer I is a copolymer of a semi-crystalline nylon A and a semi-crystalline different nylon B wherein nylon A is present in copolymer I in an amount of from about 70 percent to about 95 percent by weight and nylon B is present in copolymer I in an amount of from about 5 percent to about 30 percent by weight of copolymer I; and (b) copolymer II is a copolymer of semi-crystalline nylon A and at least one different semi-crystalline nylon C wherein nylon A is present in copolymer II in an amount of from about 40 percent to about 65 percent by weight and nylon C is present in copolymer II in an amount of from about 35 percent to about 60 percent by weight of copolymer II; and (c) wherein nylon A and nylon B are selected from the group consisting of nylon 6 and nylon 66; and (d) wherein nylon C is selected from the group consisting of nylon 9, nylon 11, nylon 12, nylon 46 and nylon 69.

2. The composition of claim 1 which has only one melting point.

3. The composition of claim 1 wherein the amount of copolymer I ranges from about 75% to about 95% and the amount of copolymer II ranges from about 5% to about 25% based on the weight of the composition.

4. The composition of claim 1 wherein the amount of copolymer I ranges from about 90% to about 93% and the amount of copolymer II ranges from about 7% to about 10% based on the weight of the composition.

5. The composition of claim 1 wherein the amount of nylon A in copolymer I ranges from about 75% to about 90% and the amount of nylon B ranges from about 10% to about 25% by weight of copolymer I.

6. The composition of claim 1 wherein the amount of nylon A in copolymer I ranges from about 80% to about 85% and the amount of nylon B ranges from about 15% to about 20% by weight of copolymer I.

7. The composition of claim 1 wherein the amount of nylon A in copolymer II ranges from about 50% to about 65% and the amount of nylon C ranges from about 35% to about 50% by weight of copolymer II.

8. The composition of claim 1 wherein nylon A comprises nylon 6.

9. The composition of claim 1 wherein nylon A comprises nylon 66.

10. The composition of claim 1 wherein nylon C comprises nylon 69.

11. A method for producing a substantially uniform nylon composition which comprises:

(i) forming a mixture consisting essentially of solid particles of at least one semi-crystalline copolymer I and at least one semi-crystalline copolymer II, wherein the proportion by weight of each of copolymer I and copolymer II is such that the composition has only one significant melting point; wherein (a) copolymer I is a copolymer of a semi-crystalline nylon A and a semi-crystalline different nylon B wherein nylon A is present in copolymer I in an amount of from about 70 percent to about 95 percent by weight and nylon B is present in copolymer I in an amount of from about 5 percent to about 30 percent by weight of copolymer I; and (b) copolymer II is a copolymer of semi-crystalline nylon A and at least one different semi-crystalline nylon C wherein nylon A is present in copolymer II in an amount of from about 40 percent to about 65 percent by weight and nylon C is present in copolymer II in an amount of from about 35 percent to about 60 percent by weight of copolymer II; and (c) wherein nylon A and nylon B are selected from the group consisting of nylon 6 and nylon 66; and (d) wherein nylon C is selected from the group consisting of nylon 9, nylon 11, nylon 12, nylon 46 and nylon 69; and (ii) melt blending the mixture at a temperature of at least the higher of the melting points of copolymer I or copolymer II.

12. The method of claim 11 wherein nylon A comprises nylon 6.

13. The method of claim 11 wherein nylon A comprises nylon 66.

14. The method of claim 11 wherein the amount of nylon A in copolymer II ranges from about 50% to about 65% and the amount of nylon C ranges from about 35% to about 50% by weight of copolymer II.

* * * * *